Patented Oct. 8, 1935

2,016,962

UNITED STATES PATENT OFFICE 2,016,962

PROCESS FOR PRODUCING GLUCAMINES AND RELATED PRODUCTS

Robert B. Flint and Paul L. Salzberg, Wilmington, Del., assignors to E. I. du Pont de Nemours & Company, Wilmington, Del., a corporation of Delaware No Drawing. Application September 27, 1932, Serial No. 635,045

18 Claims. (Cl. 260—127)

This invention relates to the art of producing amino alcohols, and it pertains more particularly to the catalytic liquid phase hydrogenation of open-chain aliphatic hydroxy aldehydes or ketones, such as the monosaccharides, in the presence of ammonia or open-chain aliphatic primary or secondary amines. The aliphatic amino groups may be saturated or unsaturated, and may contain substituents other than hydrogen in their aliphatic radicals.

An object of this invention relates to the catalytic hydrogenation of compositions comprising aliphatic open-chain hydroxy carbonyl compounds and ammonia or aliphatic open-chain amines having a replaceable amino hydrogen atom. A still further object of the invention comprises effecting this reaction at elevated temperatures and pressures in the presence of a base metal catalyst. A further object is the efficient and economical preparation of cheap, water-soluble, non-volatile hydroxy amino compounds. Another object relates to the preparation of polyhydroxy aliphatic amines, e. g., glucamines from monosaccharides. Other objects will appear hereinafter.

These objects are accomplished by the following invention which comprises in its preferred form dissolving a monosaccharide such as glucose, etc., in ammonia or an aliphatic amine having a replaceable amino hydrogen atom or in an aqueous or alcoholic solution of ammonia or of the aliphatic amine, then subjecting this solution to the action of hydrogen at an elevated temperature and pressure in the presence of a base metal catalyst having a hydrogenating effect. The intermediate product of the reaction of the carbonyl compound and the amine or ammonia may be of the type $RCH(OH)NR_2'$ or $RCH=NR'$ but in either case it is hydrogenated to an amine of the type $RCH_2NR_2'$ where R is a hydrogenated radical and R' is hydrogen or an open-chain aliphatic radical.

It has been found, in accordance with the present invention, that stable hydroxy amino compounds can be readily prepared by reacting ammonia or aliphatic amines having a replaceable hydrogen with monosaccharides with subsequent or simultaneous reduction under elevated temperatures and pressures employing a nickel catalyst. It is preferred to use reducing sugars as the hydroxy carbonyl compound in this reaction because of the availability and cheapness of certain of these sugars and the fact that completely non-volatile, highly useful products are obtained in good yield.

The following examples of the invention are included merely for purposes of illustration and are not to be regarded as limitations:

*Example 1.*—Twenty-five hundred grams of commercial glucose were charged into a pressure vessel with 2500 grams of a 21% aqueous ammonia solution and 250 grams of a reduced nickel catalyst. The latter was prepared by the precipitation of nickel carbonate on kieselguhr and after reduction contained 20% metallic nickel. Hydrogen was introduced to a pressure of 1500 lbs. and the contents of the vessel were stirred rapidly without heat for 30 minutes to effect complete solution of the glucose. When the solution was heated, hydrogen absorption began at 63–65° C. and the temperature was allowed to rise to 90–95° C. where it was maintained for about 30 minutes. Hydrogen was introduced periodically to replenish that used in the reaction. The solution, free from reducing sugars as tested by Fehling's solution, was filtered and concentrated and glucamine was obtained in good yield as a viscous non-crystalline syrup. From the anhydrous syrup glucamine could be crystallized out of methyl alcohol as a white crystalline compound melting at 127° C.

*Example 2.*—One hundred grams of commercial glucose dissolved in 100 grams of a 22% aqueous ammonia solution and 10 grams of a catalyst prepared by precipitating reduced nickel carbonate on carbon were violently agitated under 1500 lbs. hydrogen pressure. Absorption of hydrogen began at 110° C. and the temperature was allowed to reach a maximum of 120° C. Hydrogen absorption was complete in 30 minutes. The product was separated from catalytic material by filtration and the filtrate evaporated. Glucamine was obtained as a viscous, non-crystalline syrup.

*Example 3.*—One hundred grams of xylose dissolved in 100 grams of a 22% aqueous ammonia solution and 10 grams of a catalyst containing 20% reduced nickel prepared by precipitating nickel carbonate on kieselguhr were violently agitated under 2400 lbs. hydrogen pressure. Absorption of hydrogen began at 100° C. and the temperature was allowed to reach a maximum of 125° C. Hydrogen absorption was complete in seven minutes and after ten minutes the solution was free from reducing sugars as tested with Fehling's solution. The product was separated from the catalytic material by filtration and the filtrate evaporated. A good yield of xylamine was obtained as a viscous non-crystalline syrup.

*Example 4.*—One hundred grams of invert cane sugar, 100 grams of water, 35 grams of liquid ammonia and 10 grams of a catalyst comprising 20% reduced nickel supported on kieselguhr were shaken vigorously in a pressure vessel under 1400 lbs. hydrogen pressure. Absorption of hydrogen began at 90° C. and was complete in 30 minutes with the temperature reaching a maximum of 120° C. The product was separated from the catalytic material by filtration and the filtrate evaporated. A viscous non-crystalline syrup was obtained which gave a molecular weight of 225 upon titration with dilute HCl using methyl orange as indicator.

*Example 5.*—One hundred grams of commercial glucose, 80 grams of water and 80 grams of monomethylamine were charged into a pressure vessel with 9 grams of a reduced nickel catalyst comprising 20% reduced nickel supported on kieselguhr. Hydrogen was introduced to a pressure of 2000 lbs. and the vessel was agitated vigorously during the heating. Hydrogen absorption began at 100° C. and was complete in 15 minutes, the temperature attaining a maximum of 120° C. during this time. The product was separated from the catalytic material by filtration and the filtrate evaporated until crystallization occurred. Methylglucamine could be recrystallized from this residue as a white solid melting at 127–128° C.

*Example 6.*—Two thousand grams of commercial glucose, 3420 cc. of 45.04% aqueous monomethylamine solution and 170 grams of nickel catalyst were charged into an autoclave and stirred for about one hour under hydrogen pressure without heat. The solution was then heated slowly reaching 60° C. after about 45 minutes at which temperature initial reduction occurred. The pressure was kept between 700 and 750 lbs. for 2 hours with the temperature reaching a maximum of 95° during this time. When the catalyst was removed by filtration a light-yellow solution was obtained which did not reduce Fehling's solution. Evaporation of the excess methylamine and water gave crystalline methyl glucamine in good yield.

*Example 7.*—Seventy-five grams of commercial glucose and 200 cc. of 30% aqueous dimethylamine solution were charged into a pressure vessel with seven grams of a reduced nickel catalyst comprising 20% reduced nickel supported on kieselguhr. Hydrogen was introduced to a pressure of 2000 lbs. and the vessel was agitated vigorously while being heated. Hydrogen absorption began at 105° C. and was complete in 10 minutes, the temperature attaining a maximum of 120° C. during this time. The product was separated from the catalytic material by filtration and the filtrate evaporated. A viscous syrup of basic nature was obtained as reaction product.

*Example 8.*—One hundred grams of xylose and 100 grams of monomethylamine dissolved in 100 grams of water were charged into a pressure vessel at approximately room temperature with 10 grams of a reduced nickel catalyst comprising 20% of reduced nickel supported on kieselguhr. Hydrogen was introduced to a pressure of 2000 pounds and the vessel and the mixture gradually heated with vigorous agitation. Hydrogen absorption began at 90° C. and was complete in 45 minutes, the temperature attaining a maximum of 100° C. during this time. The product was separated from the catalytic material by filtration and the filtrate evaporated. Methylxylamine was obtained as a viscous, non-crystalline syrup which by titration with hydrochloric acid gave a molecular weight of 168 as compared with a calculated molecular weight of 165.

*Example 9.*—Fifty grams of xylose, 98 grams of monobutylamine, 70 grams of water and 5 grams of a catalyst comprising 20% reduced nickel supported on kieselguhr were shaken vigorously in a pressure vessel under 1800 pounds hydrogen pressure. When heat was applied, absorption of hydrogen began at 90° C. and was complete in 50 minutes with the temperature reaching a maximum of 100° C. The product was separated from the catalytic material by filtration and the filtrate evaporated. Butylxylamine was obtained as a viscous, non-crystalline syrup which by titration with HCl gave a molecular weight of 213 as compared with a calculated molecular weight of 207.

*Example 10.*—Eighty-four grams of commercial glucose, 228 grams of 33% aqueous monoethylamine solution and 8 grams of a catalyst comprising 20% reduced nickel supported on kieselguhr were shaken vigorously in a pressure vessel under 1500 pounds hydrogen pressure. When heat was applied, absorption of hydrogen began at 90° and was complete in two hours with the temperature reaching a maximum of 100° C. The product was separated from the catalytic material by filtration and the filtrate evaporated. Ethylglucamine was obtained as a white crystalline solid melting at 133–134° C., which by titration with hydrochloric acid, gave a molecular weight of 209, which is the calculated value.

*Example 11.*—One hundred grams of commercial glucose, 94 grams of monoethanolamine, 94 grams of water and 10 grams of a nickel catalyst comprising 20% reduced nickel supported on kieselguhr were shaken vigorously in a pressure vessel under 2000 pounds hydrogen pressure. When heat was applied absorption of hydrogen began at 90° C. and was complete in 45 minutes with the temperature reaching a maximum of 110° C. The product was separated from the catalytic material by filtration and the filtrate evaporated. Hydroxyethylglucamine was obtained as a viscous, non-crystalline syrup.

*Example 12.*—One hundred grams of galactose, 80 grams of monomethylamine, 80 grams of water and 10 grams of a catalyst comprising 20% reduced nickel supported on kieselguhr were shaken vigorously in a pressure vessel under 2300 pounds hydrogen pressure. When heat was applied, absorption of hydrogen began at 55° C. and was complete in 45 minutes with the temperature reaching a maximum of 80° C. The product was separated from the catalytic material by filtration and the filtrate evaporated. Methylgalactamine was obtained as a white crystalline solid melting at 127–128° C. which by titration with hydrochloric acid gave a molecular weight of 187 as compared with a calculated value of 195.

*Example 13.*—One hundred grams of crystalline fructose, 80 grams of monomethylamine, 80 grams of water and 10 grams of a catalyst comprising 20% reduced nickel supported on kieselguhr were shaken vigorously in a pressure vessel under 1700 pounds hydrogen pressure. When heat was applied, absorption of hydrogen began at 80° C. and was complete in 75 minutes with the temperature reaching a maximum of 100°. The product was separated from the catalytic material by filtration and the filtrate evaporated.

Methylfructamine was obtained as a viscous, non-crystalline syrup.

The invention is characterized by the use of base metal catalysts, but nickel catalysts are preferred to other base metal catalysts, e. g., copper, cobalt, copper chromate, etc.

The process may be either a batch process or a continuous process, but the batch process is generally preferred.

Organic hydroxy carbonyl compounds and particularly the monosaccharides, such as glucose, are known to decompose rapidly on heating. The success of the present process depends particularly on the choice of operating conditions such as temperature and pressure combined with highly efficient agitation, which renders the reaction feasible commercially with base metal catalysts. However, too high a temperature must be avoided. The temperature may range between 50° and 200° C., the preferred range being about 80°–125° C. The nickel catalysts described herein, are admirably suited for the reaction, being extremely efficient and relatively inexpensive.

Agitation is highly desirable during the reaction. It may be effected satisfactorily by internal stirring, as in an autoclave, or the entire vessel may be agitated externally. In fact, any method whereby the gas, liquid, and catalyst are brought into intimate contact will expedite the reaction.

Elevated pressure must be used during the reaction. This pressure should not be lower than 15 atmospheres (absolute). The upper pressure is limited only by the strength of the vessel in which the reaction occurs. The use of pressure substantially under 15 atmospheres or of atmospheric pressure results in an extremely slow rate of absorption of hydrogen, and causes bad discoloration. The specific pressures given herein are gauge pressures.

The relatively large proportions of catalyst employed in the above examples should not be understood to be necessary for the reductions but are employed to make the reaction time as brief as possible.

It is frequently advisable to agitate the sugar, ammonia or amine, and catalyst at room temperature (20°–30° C.) and under a superatmospheric hydrogen pressure, e. g., 15 atmospheres or higher for a period of 5 to 60 minutes to insure complete reaction of the sugar with the nitrogen base, the temperature then being raised to 50° C. or higher and hydrogenation continued until hydrogen absorption ceases.

In several of the above examples equal parts by weight of hydroxy carbonyl compound and solution of the base were used but these proportions are not essential for the success of the invention. Concentrations of ammonia or amines in aqueous or alcoholic solution other than those given, and anhydrous ammonia or pure amines may be used successfully in the reaction. Where ammonia or monomethylamine are used, it is preferred to use about a 20% aqueous ammonia solution or a 50% aqueous monomethylamine solution to minimize by-product formation in those reactions where these bases are used. It is also desirable to use ammonia or the amine in substantial excess to avoid side reactions such as the formation of sorbitol.

Unsupported catalysts, prepared by reduction of the metals, are easily sintered during the reduction step with resultant loss in activity. Such catalysts are generally less satisfactory for carrying out the invention. It is preferable, therefore, to use catalysts precipitated on any of the well-known supporting materials such as pumice, silica gel, carbon, kieselguhr, fuller's earth, etc.

When glucamine is prepared with nickel-on-kieselguhr catalyst, a small amount of nickel and silica is dissolved by the ammonia but these impurities can be removed by suitable precipitants, if desired.

Other hydroxy carbonyl compounds which may be used in the process of this invention include erythrose, ribose, arabinose, lyxose, rhamnose, fucose, mannose, gulose, lactose, sorbose, etc. The process is particularly well adapted for use with reducing sugars because it affords a means of obtaining glucamines free from impurities due to caramelization.

Other amines which may be used in the process of this invention include diethylamine, mono-n-propylamine, di-n-propylamine, mono-isopropylamine, di - isopropylamine, di - n - butylamine, mono-isobutylamine, benzylamine, dodecylamine, octadecylamine, etc. In general, open-chain aliphatic amines may be used, i. e., amines in which the carbon attached to the amino nitrogen is an open-chain or aliphatic carbon. The aliphatic radical attached to the amino nitrogen may be substituted, as in benzylamine, ethanolamine, $\beta$ phenylethylamine, etc. Glucamine may also be reacted further with glucose to form diglucamine, etc.

The amino alcohols formed by this process may be used as dye assistants, as ingredients of wetting agents for viscose or acetate rayon, as textile lubricants in mineral oil emulsions, in auto and lacquer polishes, as absorbents for carbon dioxide, and hydrogen sulfide in the purification of industrial gases, for softening and cleaning skins, for softening hides, and in other uses where mildly basic water-soluble amino compounds are desirable.

An advantage of this invention is that it provides a relatively simple practical method for the preparation of certain otherwise difficultly accessible amino alcohols such as those derived from sugars. In the prior art where a nickel catalyst was used to prepare amino alcohols by liquid phase reduction of hydroxy carbonyl compounds in the presence of ammonia or amines, the reduction was very slow. Our experimental evidence has shown that even at elevated pressures and room temperature hydrogen absorption for a 100 gram sample of glucose is imperceptibly small in two hours' time. This invention, on the other hand, which includes the use of elevated pressures and temperatures of the magnitude described above, decreases the reaction time so that for a similar sample the reduction is complete in 10–20 minutes. A further practical advantage of this invention lies in the use of a base metal catalyst instead of the more expensive platinum catalysts which are employed in this type of reaction in the prior art.

The above description and examples are to be taken as illustrative only and not as limiting the scope of the invention. Any modification or variation therefrom which conforms to the spirit of the invention is intended to be included within the scope of the claims.

We claim:

1. The process which comprises heating a reaction mixture comprising essentially hydrogen, a reducing sugar and a member of the class consisting of ammonia and saturated open-chain aliphatic primary and secondary amines, at a temperature of at least 50° C. and at a pressure of at least 15 atmospheres, in the presence of a base metal hydrogenation catalyst.

2. The process in accordance with claim 1 characterized in that the reaction mixture is heated in the presence of a solvent.

3. The process which comprises heating a reaction mixture comprising essentially hydrogen, a reducing sugar and a member of the class consisting of ammonia and saturated open-chain aliphatic primary and secondary amines, at a temperature of at least 50° C. and at a pressure of at least 15 atmospheres, in the presence of a nickel catalyst.

4. The process of claim 3 in which the catalyst is supported on an inert carrier.

5. The process of claim 3 in which the reducing sugar is glucose.

6. The process of claim 3 in which the temperature is 50° to 200° C.

7. The process of claim 3 in which the pressure is at least 40 atmospheres.

8. The process of claim 3 in which the temperature is 50° to 200° C. and the pressure is at least 40 atmospheres.

9. The process which comprises heating a reaction mixture comprising essentially hydrogen, glucose and an aqueous solution of ammonia at a temperature of 50° to 125° C. and at a pressure of at least 15 atmospheres in the presence of a supported nickel catalyst.

10. The process which comprises heating a reaction mixture comprising essentially hydrogen, glucose and an aqueous solution of ammonia at a temperature of 50° to 125° C. and at a pressure of at least 15 atmospheres in the presence of a nickel catalyst.

11. The process which comprises heating a reaction mixture comprising essentially hydrogen, glucose and an aqueous solution of ammonia at a temperature of 50° to 125° C. and at a pressure of at least 40 atmospheres in the presence of a nickel catalyst.

12. The process which comprises agitating a reaction mixture comprising essentially hydrogen, a monosaccharide, and a member of the class consisting of ammonia and saturated open-chain aliphatic primary and secondary amines at a temperature of 20-30° C. for a period of 5 to 60 minutes at a pressure of at least 15 atmospheres in the presence of a base metal hydrogenation catalyst, then heating at a temperature of at least 50° C. and under a pressure of at least 15 atmospheres until hydrogen absorption is complete.

13. The process of claim 12 characterized in that the monosaccharide is glucose and the temperature is 50° to 125° C.

14. The process which comprises heating a reaction mixture comprising essentially hydrogen, glucose and an aqueous solution of monomethylamine at a temperature of 50° to 200° C. and at a pressure of at least 15 atmospheres in the presence of a supported nickel catalyst.

15. The process of claim 14 characterized in that ammonia is present in excess over the glucose.

16. The process which comprises heating a reaction mixture comprising essentially hydrogen, glucose and an aqueous solution of monomethylamine at a temperature of 50° to 125° C. and at a pressure of at least 40 atmospheres in the presence of a nickel catalyst.

17. The process which comprises heating a reaction mixture comprising essentially hydrogen, glucose and an aqueous solution of monomethylamine at a temperature of 50°–125° and at a pressure of at least 40 atmospheres in the presence of a supported nickel catalyst.

18. The process which comprises adding to a mixture, of approximately equal parts of glucose and a concentrated aqueous ammonia solution, about five percent nickel catalyst, said catalyst obtainable by reducing nickel carbonate that has been precipitated on kieselguhr, creating an atmosphere of hydrogen in contact with the mixture at a pressure about 1500 lbs. per square inch, and then heating the said mixture at a temperature of 63° C. to 95° C. until the hydrogen absorption is complete.

ROBERT B. FLINT.
PAUL L. SALZBERG.